United States Patent [19]
Nakanishi

[11] Patent Number: 5,102,215
[45] Date of Patent: Apr. 7, 1992

[54] EYEGLASS FRAME MEMBER
[75] Inventor: Eiichi Nakanishi, Hyogo, Japan
[73] Assignee: Nakanishi Optical Co., Ltd., Osakau, Japan
[21] Appl. No.: 579,534
[22] Filed: Sep. 10, 1990
[30] Foreign Application Priority Data
　Apr. 3, 1990 [JP]　Japan .............................. 2-35912[U]
[51] Int. Cl.$^5$ .............................................. G02C 13/00
[52] U.S. Cl. ...................................... 351/41; 351/129
[58] Field of Search .................. 351/41, 124, 125, 126, 351/129, 158

[56] References Cited
U.S. PATENT DOCUMENTS
4,952,044  8/1990  Murai ...................................... 351/41
4,953,966  9/1990  Segoshi et al. ......................... 351/41

Primary Examiner—Paul M. Dzierzynski
Attorney, Agent, or Firm—Antonelli, Terry Stout & Kraus

[57] ABSTRACT

Disclosed herein is an eyeglass frame member comprising a predetermined length of a rod-like material made of an alloy of super elasticity and shape-memory property, said material having a predetermined number of thin portions of a reduced diameter, the thin portions disposed at desired intervals at both sides of a middle section of said rod-like material, wherein connecting pieces made of a higher solderable metal are respectively fitted in or wound around the thin portions, the middle section being formed into a bridge, intermediate sections to which the connecting pieces are fixed being simultaneously formed into eyebrow portions to which rims for holding respective lenses are to be fixed, and end sections of the rod-like material being bent to form lugs extending rearwards.

3 Claims, 2 Drawing Sheets

EYEGLASS FRAME MEMBER

BACKGROUND OF THE INVENTION

1. Field of the Invention

The present invention relates to a metal member used as a part of eyeglass frame.

2. Description of Prior Art

There have been used stainless steels, nickel-chromium alloys, German silver, phosphor bronze or other metallic materials, as the parts constituting the metal frames of eyeglass. Recently, pure titanium or some nickel-titanium base alloys (i.e., Ni-Ti alloys) also have been made use of as said eyeglass parts because they are excellent in their properties such as mechanical strength, corrosion resistance, spring property or resilience and are lighter in their weight. In particular, Ni-Ti alloys are very useful in this field owing to their super elasticity which enhances to them the so-called "shape memory" property depending upon their compositions.

It is however difficult to solder the parts of pure titanium or the Ni-Ti alloys to each other or to other materials. Said metal or alloys should thus be coated with a nickel plating membrane or other plating before they are soldered to the other eyeglass parts made of German silver or other readily solderable materials, the plating membrane thereby being interposed for instance between Ni-Ti alloy phase and German silver phase.

Such interpositon of the plating membrane between the surfaces of soldered materials brings about insufficient junction strength. It is also disadvantageous to add such plating step to the process for manufacturing the eyeglasses.

SUMMARY OF THE INVENTION

In order to resolve the problems inherent in prior art, the present invention aims to provide an eyeglass frame member which is formed as an integral part made of a material of super elasticity wherein rims and temples or bows of an eyeglass assembly can be fixedly secured to said member so that shape-memory property of the material is efficiently utilized to improve the eyeglass assembly.

According to the invention, an eyeglass frame member comprises a predetermined length of a rod-like material of super elasticity and shape-memory property, the rod-like material having a predetermined number of thin portions disposed at desired intervals at both sides of a middle section and at ends of said rod-like material. The eyeglass frame member further comprises intermediate connecting pieces which are made of a highly solderable metal and fitted in or wound around the thin portions, wherein the middle section is formed into a bridge, intermediate sections to which the intermediate connecting pieces are fixed being thereby formed into eyebrow portions to which a pair of rims for holding respective lenses are to be attached, and end sections including the thin portions at ends of the rod-like material being bent to form lugs extending rearwards.

End connecting pieces made of the same or other highly solderable metal as the intermediate connecting pieces are attached to the lugs at the thin portions so that hinges for mounting temples or bows can be secured thereto.

It is preferable to press the rod-like material and the connecting pieces into a flat shape, and to simultaneously engrave any decorative pattern on outer surfaces of said connecting pieces.

Such an eyeglass frame member is advantageous in that the bridge and lugs are of an excellent shape-memory property, and the rims and temples can be rigidly fixed to the frame member by means of the connecting pieces.

In particular, the eyeglass frame member in the invention comprises the bridge, the eyebrow portions for the rims, and the lugs for the temples which are integral with each other and are made of the metal of super elasticity enhancing the shape-memory property. Even if a strong force would cause the rims or the temples to deform, their original shapes will be recovered soon after the force is relieved, to thereby improve the function or comfortableness of eyeglasses made of the frame member provided by the invention. In addition, the eyeglass parts such as the rims and temples are made capable of being fastened to the eyeglass frame member by means of the highly solderable connecting pieces, thereby providing eyeglasses of an improved mechanical strength.

BRIEF DESCRIPTION OF THE DRAWINGS

The invention will become more apparent from the description made hereinafter referring to the drawings, in which.

DETAILED DESCRIPTION OF PREFERRED EMBODIMENTS

Figure 1:
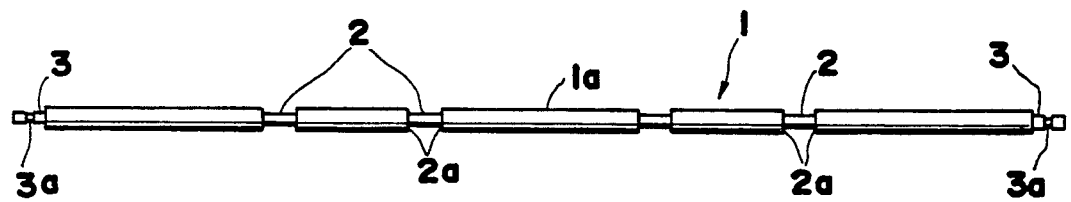
FIG. 1 is a front elevation showing a rod-like material from which an eyeglass frame member in the invention is formed.
Figure 2:
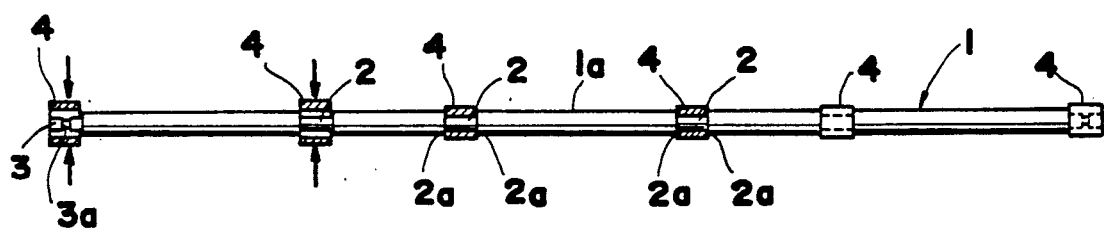
FIG. 2 illustrates a process for attaching connecting pieces to the rod-like material.

A rod-like material 1 as shown in FIG. 1 is a main body from which an eyeglass frame member in the invention is made. The rod-like material 1 is a predetermined length of a Ni-Ti alloy rod which is of a super elasticity enhancing an excellent shape-memory property. A middle section 1a is of a given length corresponding to a bridge. Intermediate thin portions 2 of a reduced diameter are formed at both sides of the middle section 1a at suitable intervals, and end thin portions 3 of a reduced diameter are formed at ends of the rod-like material 1.

Intermediate and end connecting pieces 4 are made of a highly solderable metal such as German silver or the like, and are of a cylindrical shape to be fitted on the rod-like material 1. Length of the connecting pieces 4 is substantially the same as that of the thin portions 2 and 3. The connecting pieces 4 are fitted in said thin portions 2 and 3, and thereafter pressed in a direction perpendicular to an axis of the rod-like material. Said connecting pieces 4 which are thus deformed into a depressed shape are tightly secured to the thin portions 2 and 3. Shoulders 2a located at boundaries of each intermediate thin portions 2 are effective to prevent each intermediate connecting piece 4 from moving along the rod-like material in axial direction thereof. On the other hand, annular grooves 3a are formed respectively in the end thin portions 3 at the ends of the rod-like materials so that the end connecting pieces 4 may not be removed therefrom. It is preferable to force an inner surface portion of each piece 4 into each annular groove 3a, or to employ other suitable means for retaining said pieces 4 in the annular grooves 3a.

Figure 3:
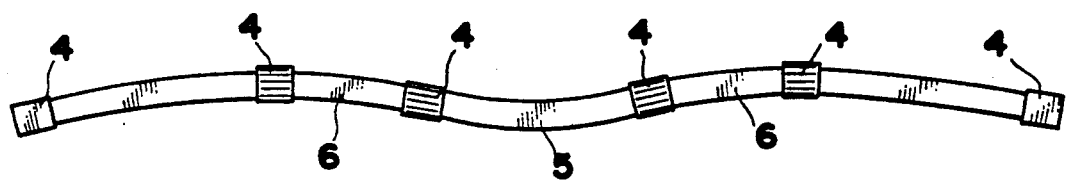
FIG. 3 is a front elevation illustrating another process for the shape-setting of the eyeglass frame member.

A blank consisting of the rod-like material and the connecting pieces is subjected to a pressing process wherein a depressed and curved shape as shown in FIG. 3 is given to the blank at a stroke. The middle section thereby becomes a bridge 5, and intermediate sections including the intermediate connecting pieces 4 become eyebrow portions 6. It is desirable to engrave a decorative pattern on the outer surfaces of said connecting pieces 4 when the pressing process is effected.

Figure 4:
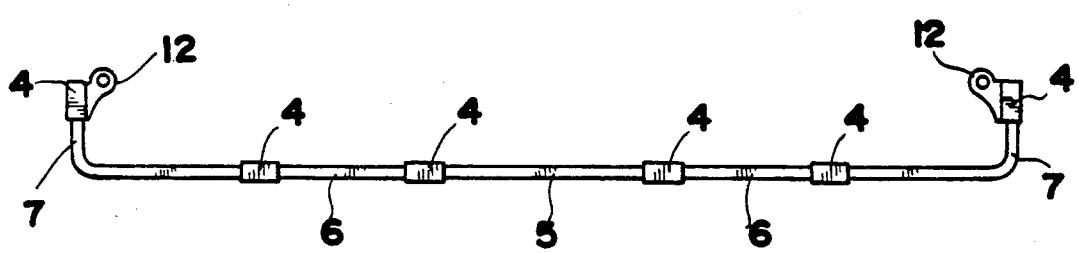
FIG. 4 is a plan view showing a finished shape of the eyeglass frame member.

Subsequently, end sections of the blank are bent to face each other at the same side of said blank so as to form lugs 7 which complete the eyeglass frame member as shown in FIG. 4.

Figure 5:
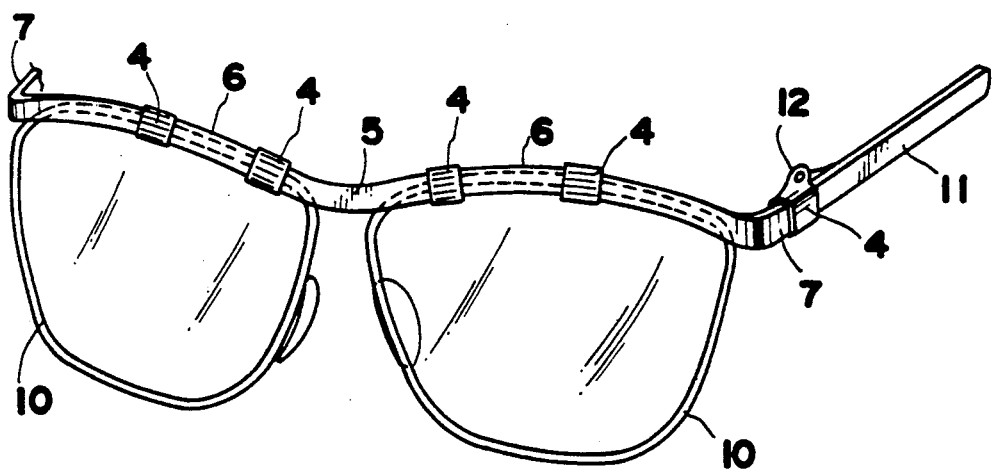
FIG. 5 is a perspective view showing main portions of an eyeglass which is assembled using the eyeglass frame member.

FIG. 5 illustrates an eyeglass assembly comprising the frame member of such a structure as described above. A pair of rims 10 are soldered or welded to the connecting pieces 4 of the eyebrow portions 6. A pair of temples 11 are fastened to hinges 12 which are soldered or welded to the connecting pieces 4 of the lugs 7.

What is claimed is:

1. An eyeglass frame member comprising: a predetermined length of a rod-like material of super elasticity and shape-memory property and having a middle section; a predetermined number of thin portions of a reduced diameter, the thin portions disposed at desired intervals at both sides of the middle section; connecting pieces made of a highly solderable metal and respectively fitted in or wound around the thin portions; the middle section being formed into a bridge; intermediate sections to which the connecting pieces are fixed being formed into eyebrow portions to which a pair of rims are to be attached; and end sections of the rod-like material being bent to form a pair of lugs extending rearwards.

2. An eyeglass frame member according to claim 1 further comprising other connecting pieces of a highly solderable metal which are fixed to the lugs extending rearwards.

3. An eyeglass frame member according to claim 1 wherein the rod-like material as well as the connecting pieces are pressed into a depressed shape.

* * * * *